Dec. 13, 1966  G. W. PIERCE  3,290,750
LOCKING LINK-CONNECTOR

Filed March 9, 1965  2 Sheets-Sheet 1

INVENTOR
GEORGE W. PIERCE

BY

ATTORNEY

Dec. 13, 1966  G. W. PIERCE  3,290,750
LOCKING LINK-CONNECTOR
Filed March 9, 1965  2 Sheets-Sheet 2

INVENTOR
GEORGE W. PIERCE

BY

ATTORNEY

United States Patent Office 3,290,750
Patented Dec. 13, 1966

3,290,750
LOCKING LINK-CONNECTOR
George W. Pierce, 2916 Lincoln St., Eugene, Oreg.
Filed Mar. 9, 1965, Ser. No. 438,292
6 Claims. (Cl. 24—234)

The present invention relates to an improvement in quick locking and unlocking connectors for linking chains, cables, ropes and the like and, while useful for many other purposes where a hook-type connector may be employed, is particularly useful for connecting safety hawsers between a tractor road vehicle and its attached trailer road vehicle or between the cars of locomotive trains, or with boat hawsers or towlines.

The object of this invention is to provide a simple inexpensive, sturdy and practical locking link-connector, having a minimum number of parts, which firmly and safely maintains a chain link, or a loop of cable or rope, in locked engagement therewith against any normal strain or stress imposed thereon within its load and shock receiving capacity, or which may tend to distort the link-connector, unless deliberately released; and, to this end, the locking link-connector consists in the particular construction and arrangement of its various parts set forth in the following specification and pointed out in the appended claims.

In the drawings, which form a part of this specification:

Figure 5:
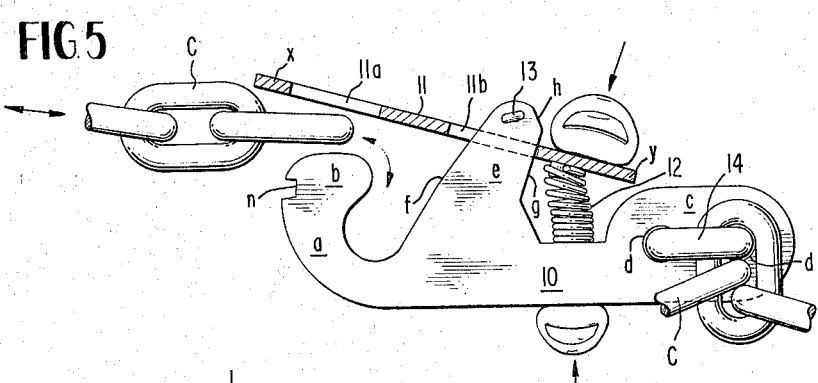
Figure 6:
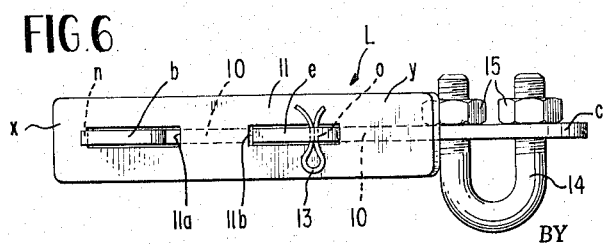

FIGURE 5 is also a similar side elevational view illustrating the position assumed by the lock-bar at the end of the manual unlocking movement of the lock-bar permitting a loop, chain-link or the like to be removed from the hook end of the locking link-connector or permitting such loop, etc., to be placed in or on said hook end; and FIGURE 6 is a top plan view of the locking link-connector per se with the hawser line removed.

Like characters of reference refer to similar and like parts throughout the several views of the drawings.

The locking link-connector L of this invention comprises an integral unitary link member 10, a unitary lock-bar 11, a compression spring 12 and a removable assembly-retaining member 13, such as a cotter pin or the like.

The link member 10 is essentially a flat and elongated shank of suitable thickness and width and of an appropriate material to have the tensile strength for the work to be done by it and is, preferably, stamped from sheet metal, such as steel, to have a profile form, now to be described, or may be sliced from an extruded length of aluminum alloy or magnesium alloy having such a cross-sectional form.

The profile of the link member 10 is a wide flat shank having one end formed into a crook or hook $a$, the extremity of which being knobular, as at $b$, and adapted to engage and hook into a link of a chain C, or loops of a cable or rope, or other bail-like members or openings. The other end $c$ of the link member 10 is formed for attachment, by any suitable means, with a chain, cable, rope or other device with which the link-connector L is useful; but is here shown as being of enlarged width and provided with two spaced openings $d$ to receive the free ends of a clevis 14, which is held in place by nuts 15 threaded on its free ends (see FIG. 6). The medial portion of the link member 10 is formed, also, with an integral extension $e$ which projects laterally from its edge between the bight or crook $a$ and the enlarged end $c$ to lie in the plane of the crook or bight for maintaining the lock-bar 11 in position and to cam the lock-bar into and out of locked position. The edge $f$ of the extension $e$—i.e. the edge nearest the crook $a$—is on an inclined slope from the inside curve of the crook or bight to its outer extremity—i.e. at an obtuse angle relative to the longitudinal axis of the link member 10—and serves as a cam to shift the lock-bar 11 to unlocking position. The outer extremity of the extension $e$ is, at least, coextensive with the lateral offset of the crook $a$ relative to the shank of the link member 10 or, preferably as shown, terminates a short distance outwardly beyond the crook. The other edge of the extension $e$—i.e. nearest the link end $c$—has, at least, its upper portion $g$ at an acute angle relative to the length of the link member 10 and acts as a cam to shift the lock-bar to locked position. The outer perimetrical edge of the crook $a$ is formed with a notch $n$ to receive a slotted end of the lock-bar 11, as will now be explained, the notch $n$ being preferably a U-shaped groove, the bottom wall of which is substantially parallel with a land $h$ immediately outward of the cam edge $g$.

The lock-bar 11 is a flat elongated member and, preferably, rectangular and of the same material and gauge and formed in the same manner as the link member and of a width about 4 to 5 times the thickness of the link member 10. This lock-bar is designed to be carried floatably by the link member 10 and cam actuated into and out of locking engagement with the outer perimeter of the crook $a$, under the influence of a biasing means and the counter-biasing pressure of the fingers of the human hand. To this end, the length of the bar 11 is such as will span the distance between the crook end $a$ and the cam extension $e$ of the link member 10, while providing a stout latch end piece $x$ to engage in the notch $n$ and a finger actuator end piece $y$. This is accomplished by providing the lock-bar 11 with two spaced and aligned closed end slots 11$a$ and 11$b$, extending through the longitudinal center thereof, and so positioned and of sufficient length and width to receive slidably therein, respectively, the knobular end $b$ of the crook $a$ and, at least, the upper effective camming portion of the extension $e$ of the link member 10. The closed ends of the slot 11$b$ serve as cam followers for cam surfaces $f$ and $g$, respectively. The lock-bar 11 is maintained in position on the link member 10 by a cotter pin 13, which is removably extended through an opening $o$ in the outer end of the projection $e$ and which opening is positioned to allow the rear end of the slot 11$b$ to engage the land $h$ but no farther outwardly. A helical compression spring 12 is interposed between the finger actuator piece $y$ and the opposing edge of the link member 10 and is held in position by centering studs 16 and 17 provided, respectively, on said finger actuator and said edge of the link member. The spring 12 is tensioned to exert a biasing pressure on the lock-bar 11 to move the finger actuator $y$ laterally outward from the link member 10; and this force causes the lock-bar to fulcrum on the retaining member 13, thus always biasing the latch end $x$ toward the crook end of the link member 10, as shown in dotted lines in FIGURE 3.

Figure 3:
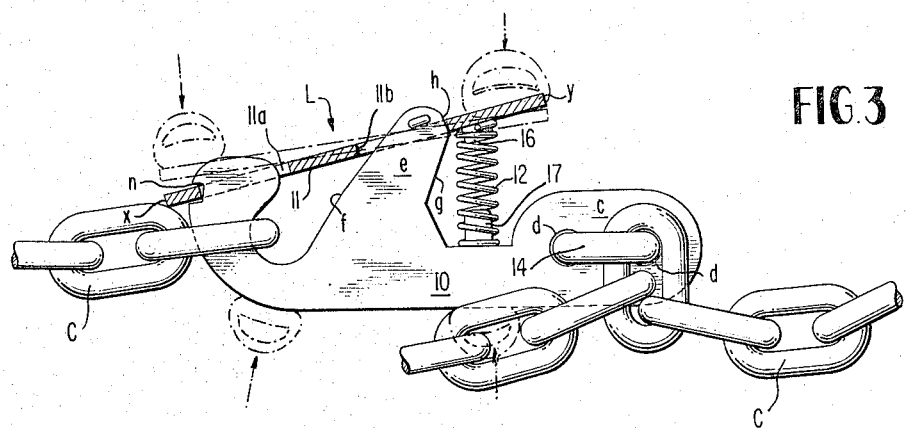
FIGURE 3 is a side elevational view of the locking link-connector, with the lock-bar in section and illustrating in full lines the position of the parts when in locked position and illustrating in dotted lines the normal position of the parts when in unlocked position.
Figure 4:
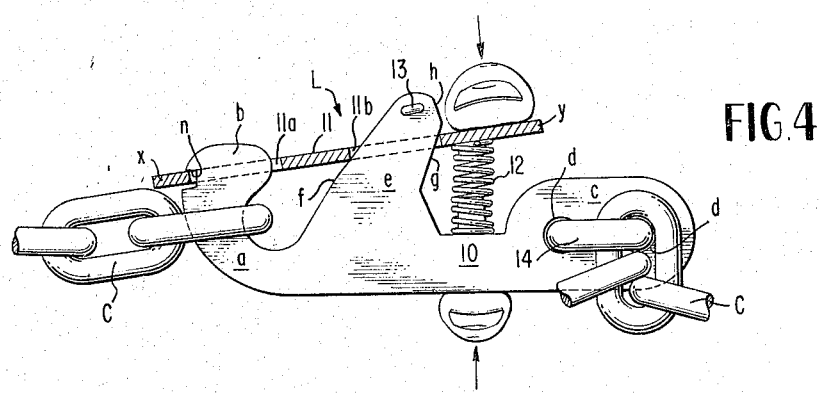
FIGURE 4 is a side elevational view similar to FIGURE 3 and illustrating the position of the lock-bar during the initial step of manually unlocking the lock-bar.

It is pointed out that the slot 11$b$ is slightly longer than the width of the outer end portion of the cam extension member e, when the rear edge of said slot is in engagement with the land h and the latch piece x is in engagement with the notch n, as clearly shown in FIGURE 3. This allows the rear edge of the slot 11b to be moved off the land h, when the finger actuator is depressed against the pressure of the spring 12, thus causing the front edge of the slot 11b to engage and ride downwardly on the declining edge f of the cam extension e, which, in turn, shifts the lock-bar 11 forwardly (as shown in FIGURE 4) to move the latch piece x out of engagement with its retaining groove or notch n and allows the lock-bar to assume the position shown in FIGURE 5, under the pressure of the finger of the human hand. When this finger pressure (as shown in FIGURE 5) is released, the lock-bar assumes the position shown in dotted lines in FIGURE 3. In either of these unlocked positions of the lock-bar 11, shown in FIGURES 3 and 5, a chain-link, loop or other device may be inserted to hook onto the crook a of the link-connector L.

When it is desired to place the lock-bar in locked position, the finger piece y is depressed by the thumb and forefinger of the hand to cause the front edge of the slot 10a to ride downward on the cam surface f and shift the lock-bar forward, while, at the same time, the thumb and forefinger of the other hand guide the latch piece x over and around the knobular end b of the crook a (shown in dotted lines of FIGURE 3) until it engages in the notch n, when, upon releasing the finger pressure, the spring 12 causes the rear end of slot 10b to ride outward on the cam surface g to draw the latch piece x tightly into the notch n, at which time the rear end of the slot 10b is resting on the land h, as shown in full lines in FIGURE 3.

In the locked position of the lock-bar 11, it acts as a bail-plate for the crook or hook a to prevent it from spreading or otherwise distorting under the stress of a load and is, itself, firmly bound in locked position against displacement or unlocking, should the loop or chain-link, to which the link-connector L is attached, exert an outward pulling force against it that would tend to distort or bow it outwardly, and will not release until a deliberate pressure is exerted inwardly upon the finger piece y, as shown in FIGURES 4 and 5.

Figure 1:
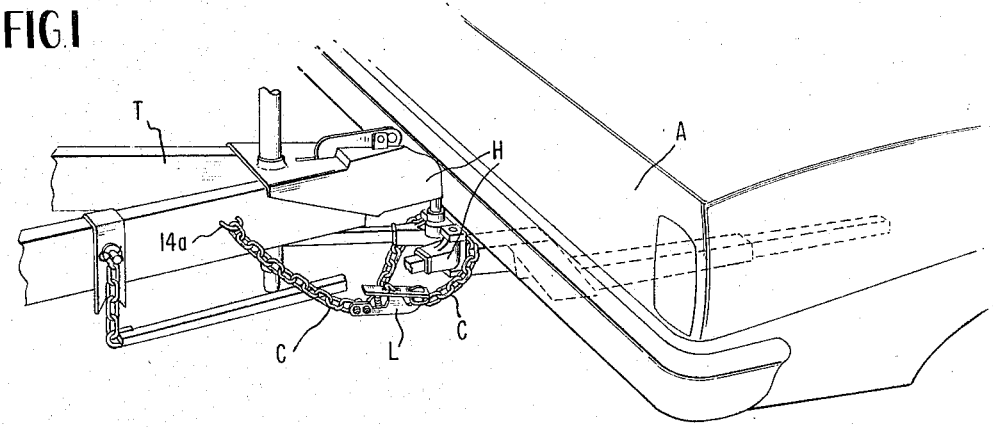
FIGURE 1 is a fragmentary perspective view of the device of this invention incorporated in a safety chain connection between the rear end of an automobile and the forward end of a trailer vehicle hitched to the automobile.
Figure 2:
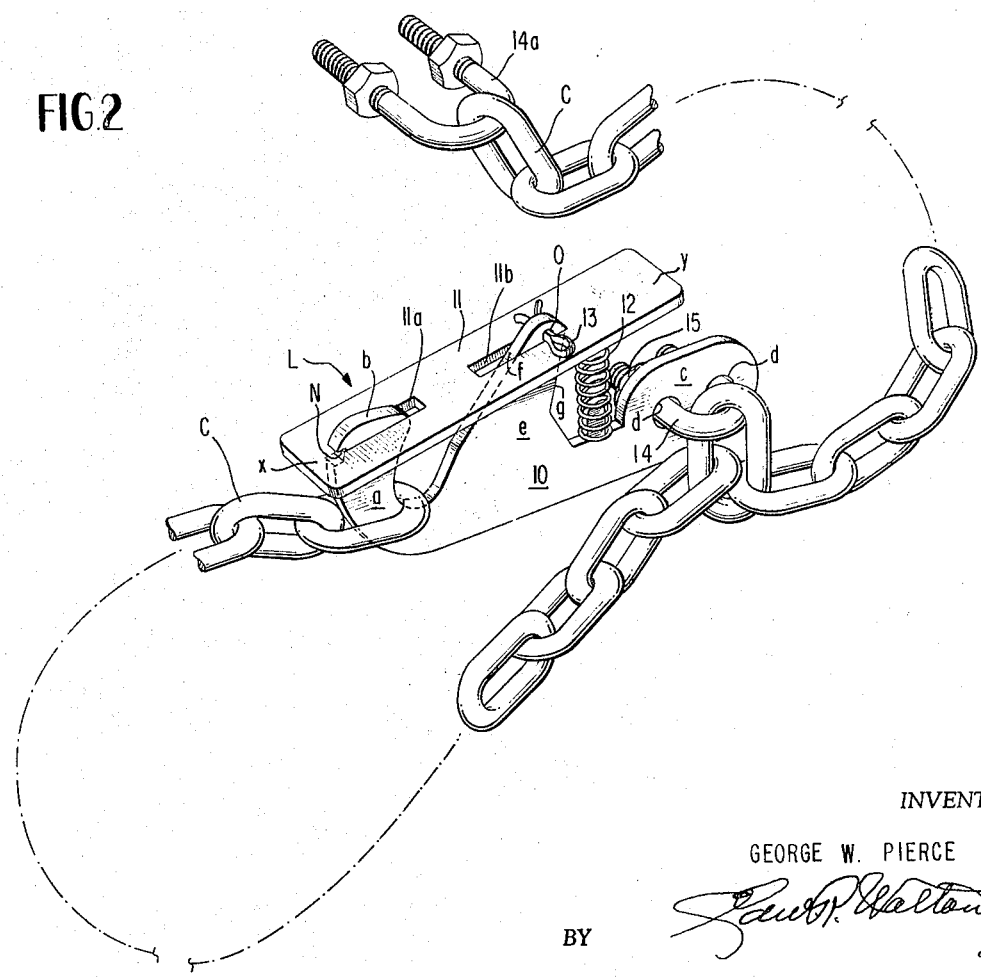
FIGURE 2 is an enlarged perspective view showing more in detail the locking link-connector in the safety chain-line shown in FIGURE 1.

The locking link-connector L may be used with any type of hawser-line C or to connect other things together. However, one prevailing use is shown in FIGURE 1— that is, of connecting a safety-chain of a vehicle trailer T which is hitched at H to a towing motor vehicle A. The connector L may be made of any size and strength required for a specific use and any type of an equivalent retaining member may be substituted for the cotter pin 13. Also, the land h on the extension e may be omitted and the acute-angled edge g may extend to the limit of the outward biased movement of the rear edge of the slot 11b of the lock-bar 11. Furthermore, the fixed attachment 14 may be omitted and the end c of the link member 10 extended outwardly and formed with a locking link-connector having parts a, e, 11, 12 and 13 as above described.

Having thus fully described the invention and the manner of performing the same, it is to be understood that it is susceptible to changes and modifications without departing from the spirit of the invention, and that such modifications as fall within the scope of the appended claims are contemplated as part of this invention.

That which is claimed, as new and to be secured by Letters Patent is:

1. A locking link-connector comprising a shank having at one end thereof a hook portion and at its other end means for attachment to an object and, further, having a lateral extension projecting from said shank between its end portions; a lock-bar spanning the distance between said extension and said hook portion to form a releasable closure for the entrance to the hook portion; cooperating interlocking parts on said hook portion and said lock-bar; means mounting the lock-bar floatably about said extension; means biasing said lock-bar outwardly of said extension; cam means on said extension cooperating with follower means on the lock-bar, when said lock-bar is depressed against its bias, to shift it longitudinally in one direction and move said interlocking parts out of engagement, whereby said lock-bar swings outwardly to open the entrance to the hook portion, and to shift said lock-bar in the other direction, when said interlocking parts are brought into opposing position and the lock-bar is released from its depressed position against its bias, thereby moving said interlocking parts into engagement and maintaining this locked engagement.

2. A locking link-connector as set forth in claim 1 wherein the cam means comprises at least an outer portion of the edge of the extension nearest the hook portion being at an obtuse angle to the axis of the shank and at least an outer portion of the opposite edge of the extension being at an acute angle to the axis of the shank.

3. A locking link-connector as set forth in claim 1 wherein said lateral extension lies generally in the plane of said hook portion and wherein the interlocking parts comprise a latch member rigid on said lock-bar and there being a notch formed in the outer perimetrical edge of the bight of the hook portion to receive and retain the latch member therein, whereby the lock-bar supports the hook portion from said extension against distorting stresses.

4. A locking link-connector comprising a shank having a hook portion at one end and means at its other end for attachment to an object; a lateral extension projecting from the shank between its end portions and lying in the plane of said hook portion; said hook portion having a notch in the outer perimetrical edge of its bight; a lock-bar spanning the distance between said hook portion and said extension and having two spaced and aligned slots therethrough, one of said slots being positioned to slidably receive the hook portion and having an edge thereof providing a latch engageable in said notch, and the other slot having said extension slidably projecting therethrough, means at the free end of the extension for retaining said extension in its slot means of said lock-bar; means biasing said lock-bar outwardly of said extension; an obtuse cam surface on one edge of said extension, cooperating with an edge of its slot, to shift the lock-bar toward said hook portion and release the said latch from said notch, when said lock-bar is depressed against its bias; and an acute cam surface on the opposite edge of said extension, cooperating with the other edge of its slot, to shift said lock-bar in the other direction, when the hook portion is inserted in its slot opposite said latch and the lock-bar is released from its depressed position against its bias, and moving and maintaining said latch into locking engagement with said notch.

5. A locking link-connector as set forth in claim 4 wherein the shank and the lock-bar are formed of flat sheet material, and the biasing means is a compression spring interposed and mounted between the shank and the rear end of said lock-bar and said lock-bar retaining means is a removable pin-like member extending through an opening in the outer end of said extension and acting as an abutment and a fulcrum for said lock-bar.

6. The subject matter of claim 4 wherein the notch in the hook portion is a U-shaped groove and wherein said acute-angled edge of said extension terminates in a land substantially parallel to the bottom wall of said groove.

References Cited by the Examiner

UNITED STATES PATENTS

| | | | |
|---|---|---|---|
| 553,123 | 1/1896 | Lyman | 24—231 |
| 1,376,278 | 4/1921 | Hokanson | 24—233 |

WILLIAM FELDMAN, *Primary Examiner.*

D. GRIFFIN, *Assistant Examiner.*